United States Patent
Hamby, Jr. et al.

[15] 3,646,999
[45] Mar. 7, 1972

[54] EPOXY RESIN SAND CONSOLIDATION REJUVENATION

[72] Inventors: Tyler W. Hamby, Jr., Metairie; William T. Strickland, Jr., New Orleans, both of La.

[73] Assignee: Shell Oil Company, New York, N.Y.

[22] Filed: May 20, 1970

[21] Appl. No.: 39,872

[52] U.S. Cl. ................................166/281, 166/295, 61/36, 260/DIG. 40
[51] Int. Cl. ..................................E21b 33/138, E02d 3/14
[58] Field of Search ....................166/281, 295, 305 R, 307; 260/DIG. 40; 61/36

[56] References Cited

UNITED STATES PATENTS

| | | | |
|---|---|---|---|
| 2,338,799 | 1/1944 | Buckley et al. | 166/295 |
| 3,368,626 | 2/1968 | Bezemer et al. | 166/295 |
| 3,339,633 | 9/1967 | Richardson | 166/295 |
| 2,367,350 | 1/1945 | Heigl | 166/307 |
| 3,100,527 | 8/1963 | Hilton et al. | 166/295 |
| 3,294,166 | 12/1966 | Havenaar et al. | 166/295 |

*Primary Examiner*—Stephen J. Novosad
*Attorney*—Harold W. Coryell and J. H. McCarthy

[57] ABSTRACT

A consolidated permeable mass of grains that contains an epoxy resin grain-bonding material that has been weakened by exposure to a resin-degradative aqueous liquid is strengthened and stabilized by contacting the permeable mass with a polyfunctional organic silane capable of functioning as a resin-to-grain bonding agent.

10 Claims, No Drawings

EPOXY RESIN SAND CONSOLIDATION REJUVENATION

BACKGROUND OF THE INVENTION

This invention relates to treating an epoxy resin-consolidated permeable mass of a granular material, such as sand. More particularly, it relates to improving the strength and degradation resistance of a permeable mass of epoxy resin-consolidated granules in or around the borehole of a well.

Epoxy resin sand consolidation treatments have proven to be generally effective for controlling unconsolidated reservoir sands which are encountered by wells. Numerous compositions and techniques have been developed for preparing epoxy resin-forming solutions and using them to consolidate such sands. The sand-consolidating treatments may be conducted in situ within a reservoir sand or may be conducted in a preconsolidated or loose mass of sand or gravel that is installed within a well that opens into an unconsolidated reservoir. Such sand consolidating formulations and techniques are disclosed in U.S. Pat. Nos. such as: 3,123,138; 3,250,330; 3,291,213; 3,294,165; 3,294,166; 3,294,168; 3,308,884; 3,339,633, and 3,368,626.

Such epoxy resin-consolidated sands may be contacted with one or more aqueous liquids that are capable of weakening the strength of the resin-to-grain bonds and weakening the strength of the consolidated mass. In general such resin-degradative aqueous liquids are aqueous electrolytes, such as a brine or an aqueous solution of one or more salts and/or acids. The mud acids, which comprise aqueous solutions of acidic materials that contain (or form) hydrofluoric acid, are particularly strong resin-degradative aqueous liquids. The resin-degradative aqueous liquid with which a consolidated sand is contacted may comprise a naturally occurring brine that is present in an oil reservoir, or a brine or an aqueous saline solution that is injected to displace oil, or a mud acid that is injected to increase the permeability of the reservoir, or the like.

An epoxy resin-consolidated sand in which the resin contains an organic silane resin-to-grain bonding agent is generally more resistant to degradation by aqueous liquid than a similar consolidation in which the epoxy resin is free of the silane. Procedures for forming silane-containing epoxy resin-consolidated sands are described in U.S. Pat. Nos. such as: 3,339,633; 3,368,625, and 3,368,626. Such silane-containing epoxy resin-consolidated sands are generally resistive to degradation by substantially neutral aqueous solutions, such as the natural brines or aqueous solutions of substantially neutral salts; but, they can be severely degraded by relatively short contacts with a mud acid

SUMMARY OF THE INVENTION

This invention is a process for increasing the strength and stability of an epoxy resin-consolidated permeable mass of grains that has been weakened by a resin-degradative aqueous liquid, comprising contacting the consolidated mass with a liquid solution of an organic silane resin-to-grain bonding agent.

This invention is, at least in part, premised on a discovery that, although other resin-to-grain bonding agents are ineffective with respect to restoring the strength of weakened epoxy resin consolidations, organic silane resin-to-grain bonding agents are effective in both restrengthening and increasing the degradation resistance of such consolidations. These effects are obtained when the silane with which the weakened consolidation is treated is either the same of different from a silane that was contained in the consolidating resin before it was weakened. Such effects are also obtained when the silane with which the weakened consolidation is treated is contained in a liquid solution that either contains, or is free of, the components for forming an epoxy resin.

The consolidations which are treated in accordance with the present invention can comprise substantially any epoxy resin-consolidated permeable masses of grains such as the consolidated sands or gravels in a granular earth formation in or around the borehole of a well. The treated consolidations can comprise permeable masses of grains that were consolidated with a resin containing a resin-to-grain bonding agent such as an organic silane, an organic phosphate, or the like. The treated consolidations can comprise those which were weakened by a relatively long exposure to a relatively mild resin-degradative liquid such as a neutral brine or by a relatively short exposure to a strongly degradative liquid such as a mud acid. Since a mud acid dissolves silica, a relatively long exposure of a consolidated sand to a mud acid may completely destroy the consolidation by dissolving the sand grains.

The present invention is particularly advantageous with respect to restoring the strength and stability of sand consolidations in which the grains have been interbonded by a silane-free epoxy resin and have been exposed to a saline aqueous fluid for a relatively long time (e.g., several weeks) at a relatively low temperature (e.g., around 100° F.) or have been exposed to such a fluid for a relatively short time at a relatively high temperature. This invention is also particularly advantageous with respect to maintaining the strength and stability of permeable masses of grains that have been consolidated with silane-containing epoxy resins and have been contacted by a mud acid such as one which has been pumped through the consolidated mass and into an oil reservoir.

An organic silane resin-to-grain bonding agent that is used in this invention may comprise substantially any polyfunctional metallo-organic compound containing at least one silicon atom attached to functional groups suitable for interacting with both a component of a granular material, such as silica, and a component of an epoxy resin, such as a polyepoxide or a polyfunctional amine. The functional group that is reactive with the granular material is preferably an alkoxy group such as a methoxy or ethoxy group. Examples of organic silanes that are particularly suitable for use in the present process include: N-aminoethy-aminopropyltriethoxy-silane, aminopropyltriethoxy-silane, glycidoxypropyltrimethoxy-silane, 3, 4-epoxycyclohexlethyltrimethoxy-silane, etc. Examples of commercially available silanes of the above type include epoxy functional silanes available from Union Carbide Company under the trade name A-186, and amino functional silanes, that are similarly available under the trade name A-1100.

The present process is preferably applied to a weakened consolidated mass before the weakening has reduced the compressive strength of the mass substantially below about 500 pounds per square inch. Where the resin-degradative fluid to which a consolidation is exposed is a brine, the present treatment can advantageously be applied as soon as feasible after an exposure equivalent to about 10 days in contact with a 5 percent aqueous solution of sodium chloride at a temperature of about 165° F. Where a well is acidized by injecting a mud acid through a consolidated sand, the acidization can advantageously be followed by the injection of a slug of organic solvent containing an organic silane resin-to-grain bonding agent.

Where a consolidation being treated is one formed by an epoxy resin free of silane, a particularly suitable silane treatment solution and treatment applying technique is disclosed in U.S. Pat. No. 3,294,166. That patent discloses the preparation and use of solutions that contain epoxy resin components dissolved in mixtures of aliphatic and aromatic solvents from which partially cured epoxy resins are precipitated as they are formed. Such solutions, preferably those containing at least about 0.05 percent by volume of a silane resin-to-grain bonding agent, are displaced into the consolidated mass and are kept in place until the resins have precipitated and cured. Another particularly suitable treatment technique is disclosed in U.S. Pat. No. 3,339,633. The use of the latter procedure differs from that of U.S. Pat. No. 3,294,166 in using a more concentrated solution of epoxy resin forming components and silane resin-to-grain bonding agent, displacing the solution into the consolidation being treated, and then overflushing the consolidation with an organic liquid that is only partially miscible with the silane and resin-containing solution.

The following examples are illustrative of various suitable specific techniques and various unobvious features of the present invention:

Example 1

Silane-containing epoxy resin-consolidated sands were prepared by packing sand in tubes having walls treated to keep the resin from becoming bonded to the walls. The sands were preflushed with (1) kerosene (2) isopropyl alcohol and (3) an aromatic oil. The preflush fluids were displaced with a resin-forming solution comprising a mixture of about 51.1 percent by volume polyepoxide (EPON–828), 34.0 percent ethylacetate, 14.4 percent 4-4'methylene dianilene, and 0.5 percent of an organic silane (A–186). The resin-forming solution was displaced by overflushing the sands with a Bright stock-diesel oil mixture. The treated sands were heated for 24 hours at 165° F., flushed with isopropyl alcohol (to remove the diesel oil) and then air dried at room temperature. These sands were consolidated substantially as described in U.S. Pat. No. 3,339,633.

Samples of such consolidated sands were saturated with mud acid and maintained at 165° F. for various times. The mud acid was an aqueous solution of 592 parts concentrated (37 percent) hydrochloric acid, 980 parts water, and 80 parts ammonium bifluoride (which forms hydrofluoric acid in the aqueous solution). The mud acid significantly reduced the compressive strengths of the consolidated sands (from about 4,700 p.s.i. to about 800 p.s.i.). This extent of reduction took place after about two hours exposure and little, if any, further reduction occurred during longer exposure time (up to 168 hours).

Samples of the mud acid-degraded consolidated sands were retreated, using a similar resin-forming solution and treatment procedure. The retreatment produced compressive strengths that were similar to the original compressive strengths. The porosity reductions caused by the second treatment were about 3.2 percent of the initial porosity.

Example 2

Samples of consolidated sands were prepared and degraded with mud acid as described in Example 1, using exposures of 5 hours at 165° F.

The mud acid-degraded samples were flushed with (1) distilled water (2) isopropyl alcohol and (3) about two pore volumes of a 5 percent solution of organic silane (A–186) in diesel oil and cured for 24 hours at 165° F. The average compressive strength of the mud acid degraded samples was only about 1,160 p.s.i. and that of the silane-treated samples was 3,120 p.s.i.

Example 3

Samples of silane-free epoxy resin consolidated sands were prepared. The consolidation procedure was different from that used in Example 1 in that (1) no organic silane was contained in the resin-forming solution and (2) the resin-forming solution was a mixture of polyepoxide (EPON–828), amino curing agent (Laramin C–260), phenol, and a mixture of aliphatic and aromatic hydrocarbon solvents. The resin-forming solution was displaced into the sand and allowed to stand without overflushing. These sands were consolidated substantially as described in U.S. Pat. No. 3,294,166.

Samples of the consolidated sands were exposed to a saline aqueous solution typical of an oil field brine for times exceeding about 10 days. The compressive strengths of the samples decreased from an average of about 3,000 p.s.i. to less than about 500 p.s.i.

Samples of the brine-degraded consolidated sands were saturated with a 1 percent (by volume) isopropyl alcohol solution of a silane resin-to-grain bonding agent (A–1100 for some samples and A–168 for some samples) and maintained at 165° F. for 24 hours. The silane treatments restored the compressive strengths to values above about 1,600 p.s.i. Samples of the brine-degraded consolidated sands were also treated as described above with isopropyl alcohol solutions containing increased amounts of up to or about 10 percent, by volume, of the above silanes as well as the silanes Z–6020 and Z–6040 (also from Union Carbide). The increases in compressive strengths were substantially the same as those mentioned above.

Samples of the brine-degraded and then silane-treated consolidated sands were reexposed to the brine at 165° F. for up to 3 weeks. No significant decreases were observable in their compressive strengths.

Tests of the type described above were also made with respect to treatments of brine-degraded consolidated sands with similar isopropyl alcohol solutions of other resin-to-grain bonding agents including: triethylphosphate, tributylphosphate, and triphenylphosphate. Although such phosphates are generally effective resin-to-grain bonding agents, these treatments failed to provide any significant increase in the compressive strengths of the brine-degraded consolidated sands.

Example 4

Samples of consolidated sands were prepared with an epoxy resin formulation devoid of silane, using the procedure described in Example 3. The compressive strengths of the consolidated sands were degraded by exposure to brine, as described in Example 3.

Samples of the brine-degraded samples were retreated with a resin formulation containing silane, using the procedure described in Example 1. The compressive strengths of the retreated samples were increased to substantially more than those of the initially consolidated samples. The permeability loss in the retreated samples was only about 6 percent (relative to the permeability of the initially consolidated samples). A re-exposure of the re-treated samples to hot brine (about 165° F.) caused no significant degradation in strength during periods up to about 21 days.

Samples of the brine-degraded consolidated sands were also retreated with a resin formulation of the type described in Example 3; except that 0.5 percent of silane (A–186) was added. The compressive strength of the retreated samples was a two- to threefold increase over that of the originally consolidated samples. A retreatment of the retreated samples in hot brine caused no significant decrease in compressive strength during periods of more than 1 week.

What is claimed is:

1. A process for increasing the strength and stability of an epoxy resin-consolidated permeable mass where the permeable mass contains exposed siliceous grain surfaces and the consolidated mass has been weakened by a resin-degradative aqueous liquid, which process comprises:
    consolidating said mass by contacting it with a sand consolidating epoxy resin formulation;
    weakening the consolidated mass by contacting it with resin-degradative liquid; and
    restrengthening the consolidated and weakened permeable mass by contacting it with a polyfunctional organic silane capable of functioning as a resin-to-grain bonding agent.

2. The process of claim 1 in which said consolidated mass is contained within a subterranean reservoir.

3. The process of claim 2 in which said consolidated mass was initially substantially free of organic silane resin-to-grain bonding agent.

4. The process of claim 3 in which said consolidated mass was weakened by exposure to a saline aqueous solution.

5. The process of claim 2 in which said consolidated mass was weakened by exposure to a mud acid containing hydrofluoric acid.

6. The process of claim 1 in which said silane is dissolved along with epoxy resin-forming components in a mixture of aliphatic and aromatic solvents from which a partially cured resin is precipitated as it is formed.

7. The process of claim 1 in which the consolidated mass is contacted by said silane by displacing a solution in which the silane is dissolved along with epoxy resin-forming components into the consolidated mass and then overflushing the mass with an oil-phase liquid which is incompletely miscible with the silane and resin-containing solution.

8. The process of claim 1 in which said silane is dissolved in an organic solvent.

9. A process for restrengthening a permeable mass of grains that contains exposed siliceous grain surfaces and was consolidated with an epoxy resin which was substantially free of organic silane and weakened by exposure to a resin-degradative aqueous liquid, which process comprises:

consolidating said mass by contacting it with a sand consolidating epoxy resin formulation;

weakening the consolidated mass by contacting it with resin-degradative liquid; and restrengthening the consolidated and weakened permeable mass by contacting it with a polyfunctional organic silane that is capable of functioning as a resin-to-grain bonding agent and is dissolved in a solution containing epoxy resin-forming components.

10. In a well-treating process in which a mud acid is injected through an epoxy resin consolidated permeable mass of grains containing exposed siliceous grain surfaces, the improvement which comprises: injecting a liquid solution of a polyfunctional organic silane capable of functioning as a resin-to-grain bonding agent through the permeable mass through which the mud acid is injected.

* * * * *